United States Patent
Johnson

[19]

[11] Patent Number: 6,155,288
[45] Date of Patent: Dec. 5, 2000

[54] FILL VALVE

[75] Inventor: Dwight N. Johnson, Carlsbad, Calif.

[73] Assignee: American Standard Inc., Piscataway, N.J.

[21] Appl. No.: 09/379,510

[22] Filed: Aug. 23, 1999

Related U.S. Application Data

[62] Division of application No. 08/974,727, Nov. 19, 1997, Pat. No. 5,964,247.

[51] Int. Cl.⁷ .............................. F16K 31/26; F16K 33/00
[52] U.S. Cl. ............................................. 137/426; 137/437
[58] Field of Search ..................... 137/426, 436, 137/437

[56] References Cited

U.S. PATENT DOCUMENTS

| | | | |
|---|---|---|---|
| 2,779,350 | 1/1957 | Owens | 137/218 |
| 2,868,492 | 1/1959 | Volcov et al. | 251/46 |
| 4,100,928 | 7/1978 | Schoepe | 137/437 |
| 4,240,606 | 12/1980 | Johnson | 137/436 |
| 4,286,619 | 9/1981 | Straus | 137/426 |
| 4,335,744 | 6/1982 | Bey | 137/522 |
| 4,508,136 | 4/1985 | Kah, Jr. | 137/218 |
| 4,600,031 | 7/1986 | Nestich | 137/426 |
| 4,646,779 | 3/1987 | Johnson | 137/426 |
| 4,765,363 | 8/1988 | Pi-Yu | 137/437 |
| 4,893,644 | 1/1990 | Giacomini | 137/218 |
| 4,945,944 | 8/1990 | Chen | 137/426 |
| 4,976,279 | 12/1990 | King, Sr. et al. | 137/218 |
| 5,217,039 | 6/1993 | Hoeptner, III | 137/218 |
| 5,255,703 | 10/1993 | Johnson | 137/426 |
| 5,439,025 | 8/1995 | Johnson | 137/426 |
| 5,715,859 | 2/1998 | Nichols-Roy | 137/426 |

FOREIGN PATENT DOCUMENTS

| 1947770 | 6/1970 | Germany | 137/437 |
|---|---|---|---|

*Primary Examiner*—George L. Walton

[57] ABSTRACT

A fill valve has a main valve with a valving surface contacted by a valve disk. A series of offset radial paths separated by a toroidal path permit free radial flow at full open and quiet tortuous flow as the valve closes. Removal of a cap permits access to the main valve for cleaning. Indicia in the valve body provide easy height adjustments. A riser base is made up of easily molded locking parts and provides a variable height adjustment structure that is shielded from view. A flexible cup performs multiple functions including serving as a pilot valve, a vacuum breaker valve and a seal. A float for operating the pilot valve is pivotally mounted without extra parts or fasteners.

10 Claims, 9 Drawing Sheets

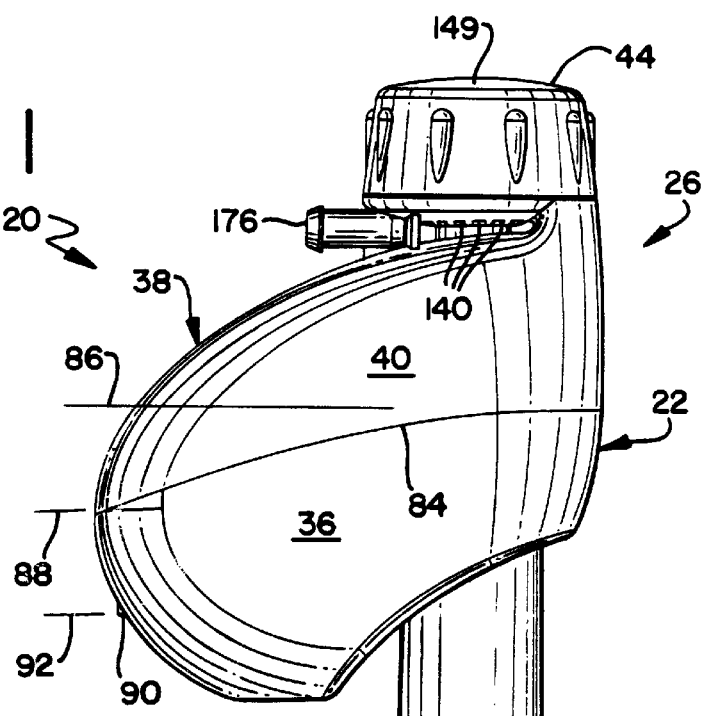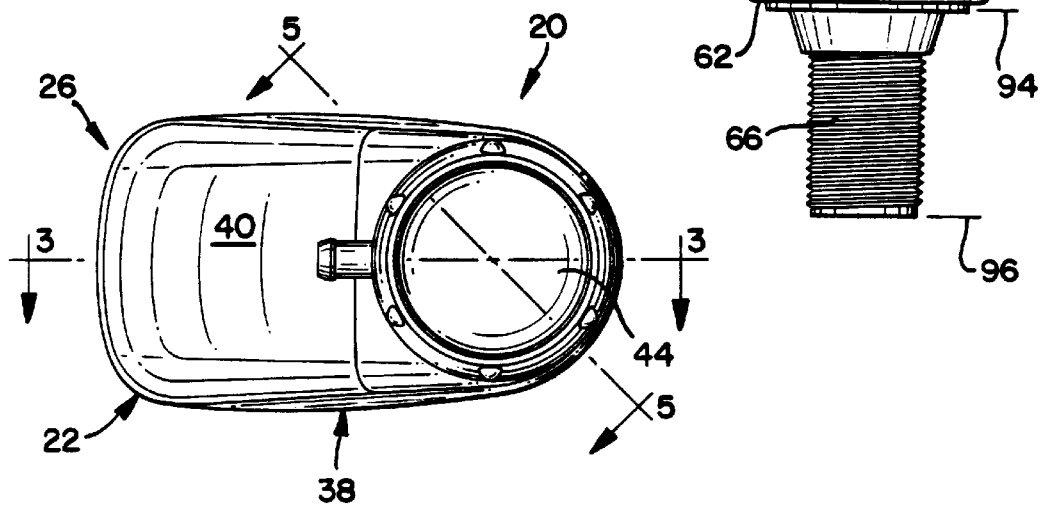

FIG. 7
FIG. 8
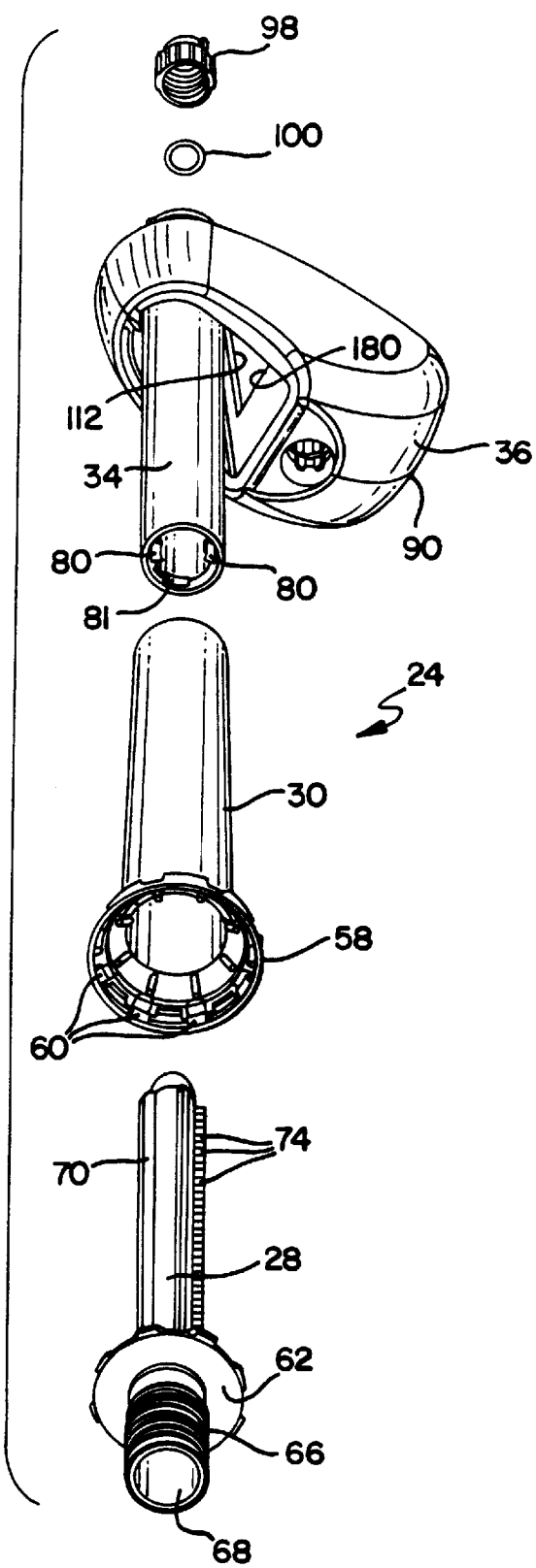
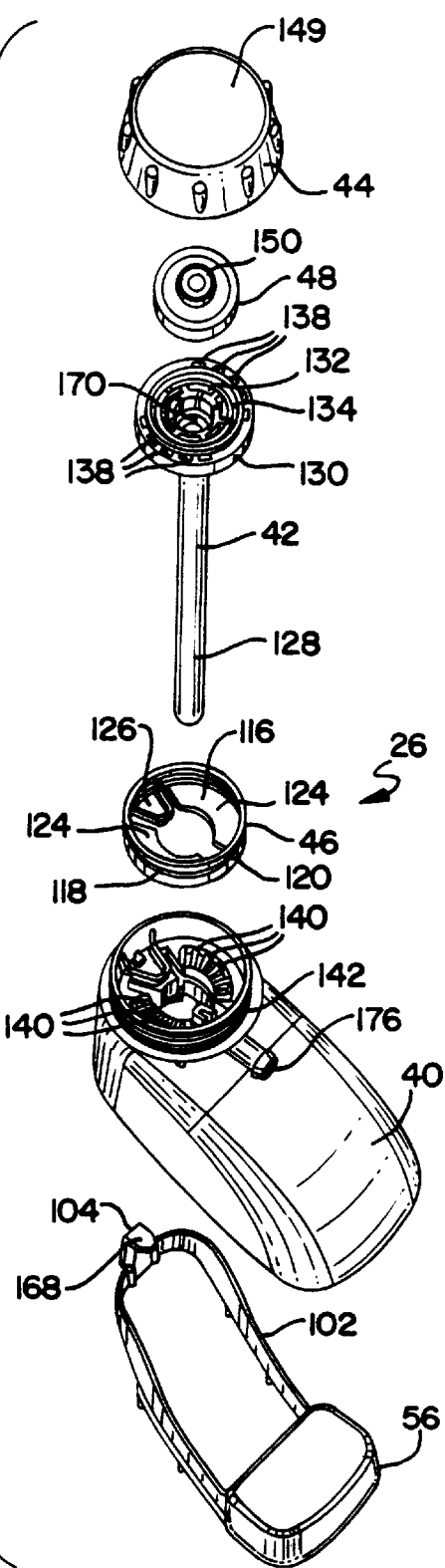

FILL VALVE

This application is a Division of application 08/974-727 filed Nov. 19, 1997, now U.S. Pat. No. 5,964,247.

FIELD OF THE INVENTION

The present invention relates to improvements in fill valves for toilet tanks and the like.

DESCRIPTION OF THE PRIOR ART

Fill valves are used to admit water from a water supply to a toilet tank to refill the tank after a flushing operation and to maintain a desired water level in the tank. A fill valve typically includes a valve that is opened to refill the tank in response to detection of a falling water level by a float or diaphragm responsive to water level in the tank. In many known valves, a pilot valve is controlled by the water level responsive member and the pilot valve in turn controls a main valve member.

One problem with known fill valves is noisy operation. Often, a fill valve makes an undesirably large noise in a low flow condition as it approaches the fully closed position. Attempts have been made to achieve quiet operation by providing a tortuous flow path so that the flow impedance attenuates noise. U.S. Pat. No. 4,240,606 discloses a fill valve having a flow impedance path with numerous baffles for dissipating fluid pressure and reducing noise and cavitation. A difficulty with the approach suggested by this patent is that the flow impedance is always in the flow path and free and unrestricted operation at a fully open valve condition is prevented.

Many fill valves employ a main valve including a flexible disk cooperating with a valving surface formed in a body under the disk. A control chamber above the disk is pressurized to close the disk against the surface or is vented by a pilot valve to permit the disk to flex away from the surface and open the valve. The region including the valve disk and valving surface can become fouled by dirt or debris in the water supply and it may be necessary to disassemble the fill valve to clean this region. U.S. Pat. Nos. 4,240,606 and 5,439,025 for example disclose fill valves that can be disassembled and cleaned. However these fill valves are subject to the disadvantage that the valving surfaces are below the valve disk and the valve disk must be removed to expose the valving surface.

Known fill valves can be complex and difficult to assemble. In the fill valve of U.S. Pat. No. 4,240,606 for example fasteners and springs are needed to support a lever for operating the pilot valve. In U.S. Pat. No. 5,439,025 for example a separate lever and two point mounting system is needed to couple a float to the pilot valve. U.S. Pat. No. 5,439,025 discloses a riser for a fill valve having a one-piece molded inlet including both an inlet conduit portion and a concentric outlet conduit portion. A disadvantage of this fill valve is that this inlet structure is difficult and expensive to manufacture.

Known fill valves of the type using a pilot valve typically require a separate element to serve as a pilot valve member cooperating with a pilot valve seat. Further complexity results when a separate member is used to provide a vacuum breaker function. Separate pilot valves are disclosed in U.S. Pat. Nos. 4,240,606 and 5,439,025. Separate vacuum breaker valves are disclosed in U.S. Pat. No. 4,646,779 and 5,439,025.

It is desirable that the height of a fill valve can be adjusted in order to select a desired tank water level. U.S. Pat. No. 4,646,779 discloses a fill valve with a threaded system for height adjustment. This is complex, requires extra parts, and cannot be quickly adjusted to different heights. U.S. Pat. No. 5,439,025 discloses a fill valve having a bayonet latch system for securing a riser portion at a selected height. A problem with this arrangement is that the unsightly bayonet teeth are exposed to view. Another problem with known height adjustable fill valves is that trial and error are needed to adjust the fill valve to achieve a desired water level.

SUMMARY OF THE INVENTION

A principal object of the present invention is to provide a fill valve incorporating improvements upon known fill valves. Other objects are to provide an improved fill valve that is quiet in operation in low flow conditions but provides unrestricted flow in the full open condition; to provide a fill valve in which the main valve disk and cooperating valving surface are easily accessed; to provide a fill valve that is easy to assemble and that does not require extraneous parts or fasteners; to provide a height adjustable fill valve that is not expensive to manufacture and wherein the height adjustment locking structure is shielded from view; to provide a height adjustable fill valve provided with indicia making it easy to adjust the valve to the desired height without trial and error; and to provide a fill valve overcoming longstanding problems with known fill valves.

In brief, in accordance with the invention there is provided a toilet tank fill valve including a housing having an inlet and an outlet and a main valve for controlling flow between the inlet and the outlet. The main valve includes a flexible valve disk having a periphery captured by the housing and having a central portion communicating with the inlet and mounted for flexing movement in the direction of the axis of the valve disk. A valving surface interfaces with a first side of the valve disk, a control chamber is at the second side of the valve disk, and a restricted passage between the inlet and the control chamber pressurizes the control chamber and forces the valve disk to a closed position against the valving surface. A pilot valve in the housing controls flow between the control chamber and the outlet. A member responsive to water level in the tank opens the pilot valve to reduce pressure in the control chamber and permit inlet pressure to flex the valve disk away from the valving surface to an open position. The fill valve is characterized by the housing including a body and a cap removable from the body. The control chamber is defined in the body and the valving surface is defined in the cap, whereby the first side of the valve disk and the valving surface are exposed when the cap is removed.

In brief, in accordance with another aspect of the invention there is provided a toilet tank fill valve including a housing having an inlet and an outlet and a main valve for controlling flow between the inlet and the outlet. The main valve includes a flexible valve disk having a periphery captured by the housing and having a central opening communicating with the inlet and a central portion surrounding the opening mounted for flexing movement in the direction of the axis of the valve disk. A valving surface interfaces with a first side of the valve disk and has a central portion aligned with the central portion of the valve disk. A control chamber is at the second side of the valve disk, and a restricted passage between the inlet and the control chamber pressurizes the control chamber and forces the valve disk to a closed position against the valving surface. A pilot valve in the housing controls flow between the control chamber and the outlet. A member responsive to water level in the tank opens the pilot valve to reduce pressure in the control chamber and permit inlet pressure to flex the valve disk away from the valving surface to an open position. The fill valve is characterized by a circular flow blocking ridge surrounding the central opening in the valve disk. A plurality of first radial flow passages in the central portion of the valving surface extend radially outward from the ridge. A peripheral flow passage communicates with the radially outer ends of the first radial flow passages and a plurality of second radial flow passages extend radially outward from the peripheral flow passage. The first and second radial flow passages are peripherally offset to induce toroidal flow in the peripheral flow passage when the valve disk is partly closed over the peripheral flow passage. The valve disk in the open position is spaced above the first radial flow passages and the peripheral flow passage to permit radial flow from the central opening to the second radial flow passages.

In brief, in accordance with another aspect of the invention there is provided A toilet tank fill valve including a housing having an inlet and an outlet and a main valve for controlling flow between the inlet and the outlet. The main valve includes a flexible valve disk having a central portion mounted for flexing movement in the direction of the axis of the valve disk. A valving surface interfaces with a first side of the valve disk. A control chamber is at the second side of the valve disk, and a restricted passage between the inlet and the control chamber pressurizes the control chamber and forces the valve disk to a closed position against the valving surface. A pilot valve in the housing controls flow between the control chamber and the outlet. A member responsive to water level in the tank opens the pilot valve to reduce pressure in the control chamber and permit inlet pressure to flex the valve disk away from the valving surface to an open position. The fill valve is characterized by the housing including an inlet tube member having an inlet tube communicating with the central portion of the valve disk and having an enlarged, disk-shaped head portion underlying the second side of the valve disk. The control chamber is defined in the head portion. The pilot valve includes a passage in the head portion terminating in a valve seat at the underside of the head portion. A flexible cup member has a base underlying the head portion and a peripheral flange portion surrounding the rim of the head portion. The base has a segment engageable with the valve seat to control flow through the pilot valve.

In brief, in accordance with another aspect of the invention there is provided a toilet tank fill valve including a housing having an inlet and an outlet and a main valve for controlling flow between the inlet and the outlet. The main valve includes a valve disk having a central portion mounted for flexing movement in the direction of the axis of the valve disk. A valving surface interfaces with a first side of the valve disk. A control chamber is at the second side of the valve disk, and a restricted passage between the inlet and the control chamber pressurizes the control chamber and forces the valve disk to a closed position against the valving surface. A pilot valve in the housing controls flow between the control chamber and the outlet. A member responsive to water level in the tank opens the pilot valve to reduce pressure in the control chamber and permit inlet pressure to flex the valve disk away from the valving surface to an open position. The fill valve is characterized by the housing including a body defining a float chamber in communication with the exterior of the housing. A float member includes a float in the chamber and a mounting lever extending to the region of the pilot valve. A pivot projection is provided on the mounting lever and the body includes a pivot nest for receiving the pivot projection and supporting the float member for pivotal movement within the housing.

In brief, in accordance with another aspect of the invention there is provided a height adjustable fill valve for a toilet tank having a valve head portion including valve means for selectively admitting water to the tank. A riser assembly is adapted to be mounted to an inlet port in the tank wall and to support the valve head portion at a location spaced above the inlet port. The riser assembly includes a central shank surrounded by an outer sleeve, the shank and sleeve defining therebetween an elongated, cylindrical cavity having an annular cross section. The head portion includes a downwardly extending tubular portion telescopingly and slideably received within the cylindrical cavity. Mating locking structures are concealed within the cavity and are formed on the tubular portion and the riser assembly for securing the head assembly at a selected height in the tank.

In brief, in accordance with another aspect of the invention there is provided a height adjustable fill valve for a toilet tank having a head portion including a body and valve means for selectively admitting water to the tank. A level responsive member closes the valve means when the tank water level reaches a predetermined elevation on the body. A riser assembly is adapted to be mounted to an inlet port in the tank wall and to support the valve head portion at a location spaced above the inlet port. The riser assembly includes slidable telescoping portions for varying the length of the riser assembly and the height of the head portion in the tank. A flange at the bottom of the riser portion is adapted to engage the tank wall and a mounting extension having a predetermined axial length is adapted to extend through the tank wall for attaching the riser assembly to the tank wall. The fill valve is characterized by a visual indicator on the body spaced a distance equal to the predetermined axial length below the predetermined elevation on the body.

BRIEF DESCRIPTION OF THE DRAWING

The present invention together with the above and other objects and advantages may best be understood from the following detailed description of the preferred embodiment of the invention illustrated in the drawings, wherein:

FIG. 1 is a side elevational view of a fill valve embodying the present invention;

FIG. 2 is a top view of the fill valve of FIG. 1;

FIG. 7 is an exploded perspective bottom view of components of the riser assembly of the fill valve of FIG. 1;

FIG. 8 is an exploded perspective top view of components of the head portion of the fill valve;

DETAILED DESCRIPTION OF THE PREFERRED EMBODIMENT

Figure 3:
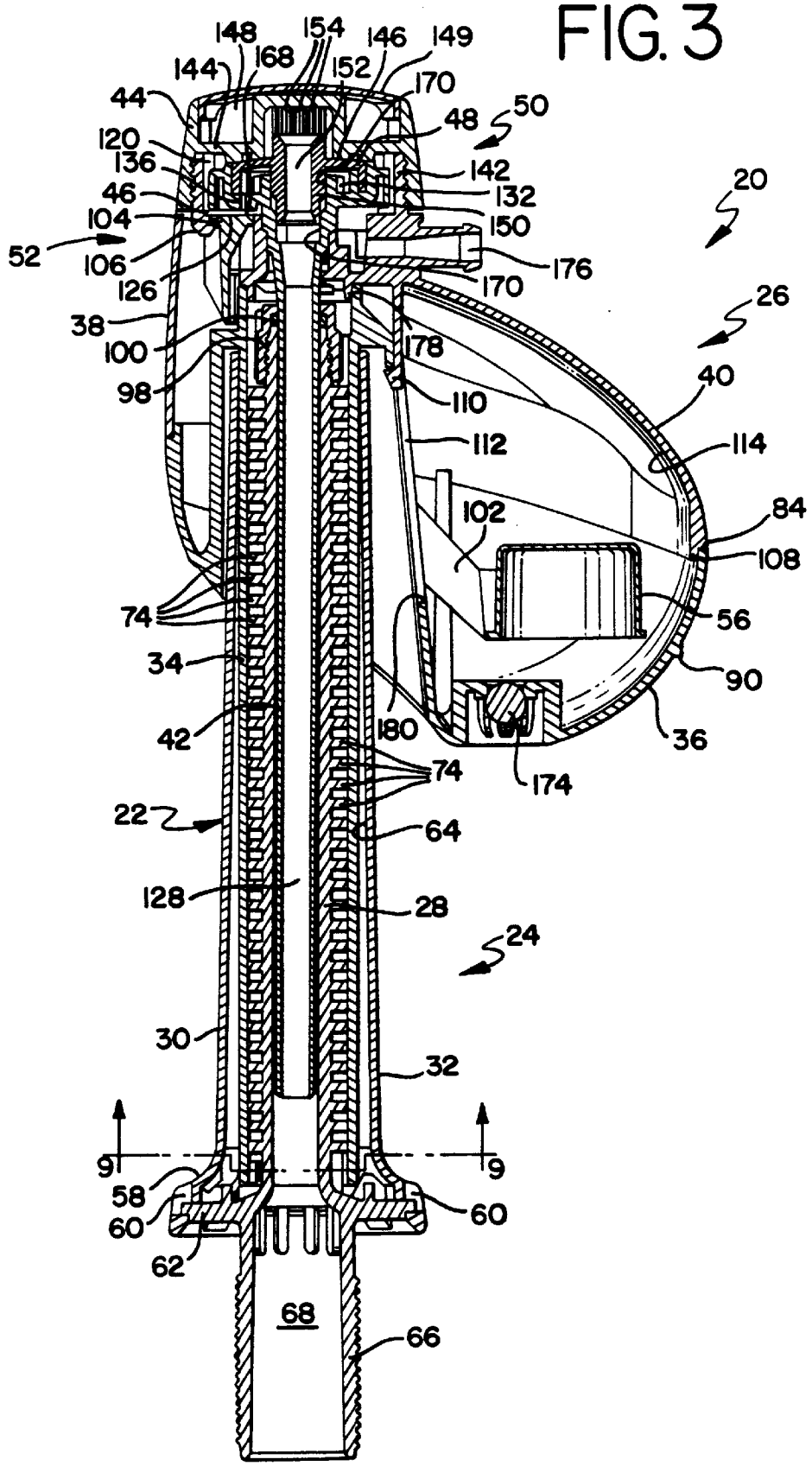
FIG. 3 is a cross sectional view of the fill valve, taken along the line 3—3 of FIG. 2 and showing the fill valve in the closed condition.

Having reference now to the drawings, and initially to FIGS. 1 and 2, there is illustrated a fill valve constructed in accordance with the principles of the present invention and designated as a whole by the reference character 20. The fill valve 20 is mounted in a toilet water tank or the like and functions to refill the tank after a flushing operation and maintain a selected water level in the tank.

In general, the fill valve 20 includes a housing generally designated as 22 having a height adjustable riser assembly 24 and a head assembly 26 supported a selected distance above a wall of a tank by the riser assembly 24. Referring to FIG. 7, the riser assembly 24 includes a shank 28 and a sleeve 30 that are attached together to form a riser base 32, as well as a downwardly extending tube portion 34 of a lower body member 36.

Referring additionally to FIGS. 3 and 8, the head assembly 26 includes a body generally designated as 38 composed of the lower body member 36 and an upper body member or cover 40. The head assembly 26 also includes a inlet tube member 42, a cap 44, a flexible cup 46 and a valve disk 48. As discussed in detail below, these components cooperate to form a main valve 50 for controlling flow through the fill valve 20, a pilot valve 52 for controlling the main valve 50 and a vacuum breaker valve 54 providing an anti-siphon feature. A float 56 responds to water level in a tank and controls the operation of the pilot valve 52.

Sleeve 30 includes a flared lower flange 58 with an array of windows 60 serving as outlet ports from which water flows from the fill valve 20 to the tank. The shank 28 includes a lower flange 62 that is received within the sleeve flange 58. The shank 28 is inserted axially into the sleeve 30, and then rotated to lock in place, forming a rigid assembly constituting the riser base 32. When joined, the shank 28 and sleeve define between them an elongated, cylindrical axially extending base cavity 64 having a relatively uniform annular cross section throughout its length. This cavity 64 telescopically receives the inlet tube member 42 and permits it to slide in order to vary the axial length of the riser assembly 24 and thus the height of the fill valve 20.

When the shank 28 and sleeve 30 are locked together they form a complex structure that would be difficult and expensive to mold as a single piece. The present invention reduces cost and simplifies the manufacture of the fill valve 20 because the shank 28 and sleeve 30 are molded as separate, discrete relatively easily molded parts, and then assembled together.

Riser base 32 is mounted to an opening in a bottom wall of a toilet tank by a threaded stud 66 projecting downwardly from the lower flange 62 of the shank 28. Conventional fittings, including one or more nuts threaded onto the stud 66, secure the riser base 32 to the tank wall with the stud 66 projecting through the tank wall and connected to a water supply conduit. As seen in FIG. 3, the interior of the shank 28 including the stud 66 define an inlet port 68 through which pressurized water from a water supply enters the fill valve 20.

Figure 9:
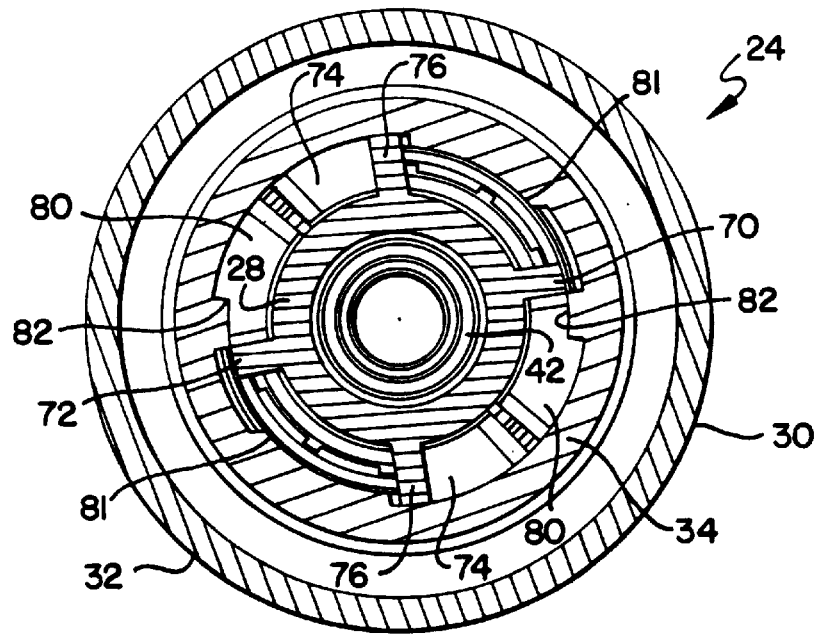
FIG. 9 is an enlarged cross sectional view taken along the line 9—9 of FIG. 3 showing the riser assembly of the fill valve in its unlocked position.

As seen in FIGS. 7 and 9, shank 28 includes an opposed pair of radially projecting flanges 70 and 72 extending axially along the cavity 64. In addition, the shank 28 includes opposed arrays of bayonet locks 74 also extending axially along the cavity 64. Each bayonet lock 74 extends in a peripheral direction from an axially extending rib 76 (FIGS. 9 and 10).

The lower inlet tube member 42 of the lower body member 36 is configured to slide into the cavity 64 and to cooperate with the bayonet locks 74 to provide a height adjustment locking function. The lowermost end of the tube portion 34 as seen in FIGS. 7 and 9 includes an opposed pair of peripherally extending lock lugs 80 sized to fit between any adjacent pair of corresponding locks 74 of the shank 28. FIG. 9 shows the unlocked position of the riser assembly 24. The lugs 80 fit between the bayonet locks 74 and the flanges 70 and 72. In this position the tube member 34 can slide vertically within the cavity 64 of the riser base 32.

Figure 10:
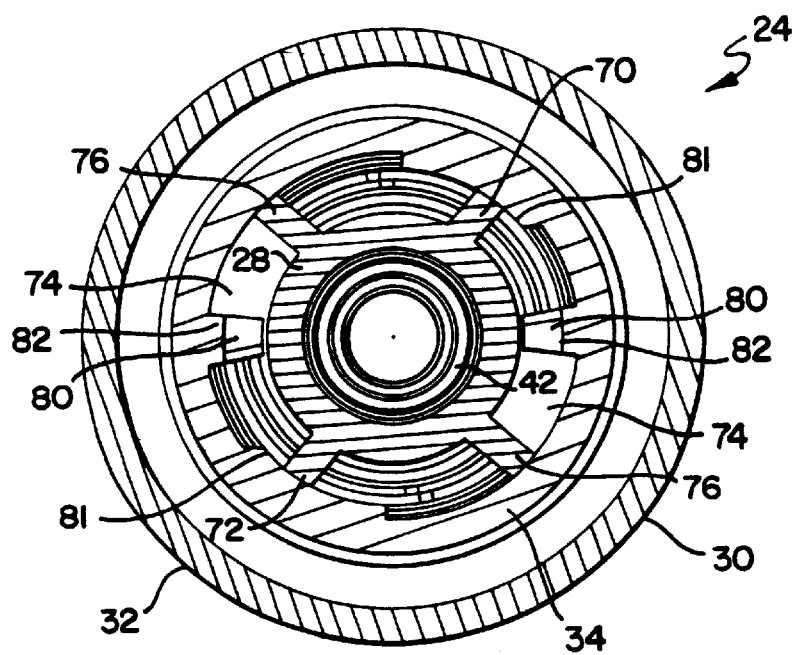
FIG. 10 is a view similar to FIG. 9 showing the riser assembly of the fill valve in its locked position.

In any selected position the riser assembly 24 can be locked by relative rotation of the riser base 32 (counterclockwise as seen in FIGS. 9 and 10) to a locked position seen in FIG. 10. If the riser base is fixed to a tank wall, then it is stationary while the lower body member 36 is rotated relative to the riser base 32. In this locked position, the lugs 80 of the tube member 34 are received between adjacent locks 74 and axial movement of the tube member 34 relative to the riser base 32 is prevented. Friction latches 81 are forced over the tops of the flanges 70 and 72 during relative rotation as can be seen by comparing FIGS. 9 and 10. These latches prevent the lugs 80 from being rotated out of the locked position.

Rotational movement in the unlocking direction is limited by engagement of stops 82 on sleeve member 34 with the flanges 70 and 72 (FIG. 9). Rotational movement in the opposite direction is limited by engagement of the locks 74 with the stops 82 and/or engagement of the lugs 80 with the stops 76 (FIG. 10).

Although the riser assembly 24 is illustrated in the drawings in its shortest, or fully retracted position, it can be adjusted to place the head assembly 26 at a wide variety of heights. This is done to tailor the riser height to the requirements of a particular toilet tank and overflow tube configuration with which the fill valve 20 is used. Referring to FIG. 1, the present invention facilitates the height adjustment of the fill valve 20.

When the fill valve 20 is installed, it is desired to adjust the riser assembly 24 so that the water level is maintained at a predetermined level below the top of the overflow tube. The body 38 of the head assembly 26 is provided with indicia to facilitate this installation. The upper and lower body members 40 and 36 meet at a visible seam or parting line 84 that slopes between an upper elevation indicated by reference line 86 and a lower elevation indicated by reference line 88. The lower part of seam 84 (reference 88) is located at the elevation where the fill valve 20 maintains tank water level, and the difference in elevation between the references 86 and 88 is equal to the suggested difference in elevation between the top of an overflow tube and the tank water level.

When installing the fill valve, the user can easily adjust the riser height to obtain the correct water level by placing the upper portion of the seam 84 (reference 86) at the same height as the top of the tank overflow tube. As one alternative, some toilet tanks have a water level indicator such as a line integral with the tank material. In this type of installation, the user can place the lower portion of the seam 84 (reference 88) at the same height as the tank's water level indicator.

A height adjustment lug 90 is formed as in integral molded part of the body 38. The elevation of lug 90 is indicated by reference line 92. The difference in height between the lug 90 (reference 92) and the upper portion of the seam 84 (reference 86) is equal to the distance from the underside of the flange 58 (reference line 94) to the end of the stud 66 (reference line 96). Another way to adjust the fill valve height is to place the end of the stud 66 against the tank wall and adjust the riser height so that the lug 90 is at the same height as the top of the overflow tube. When the fill valve 20 is then installed with the stud 66 extending through a tank opening and the flange 58 is bottomed in the tank, the top of the seam 84 (reference 86) is aligned with the top of the overflow tube and the water level (reference 88) is at the proper elevation.

Figure 4:
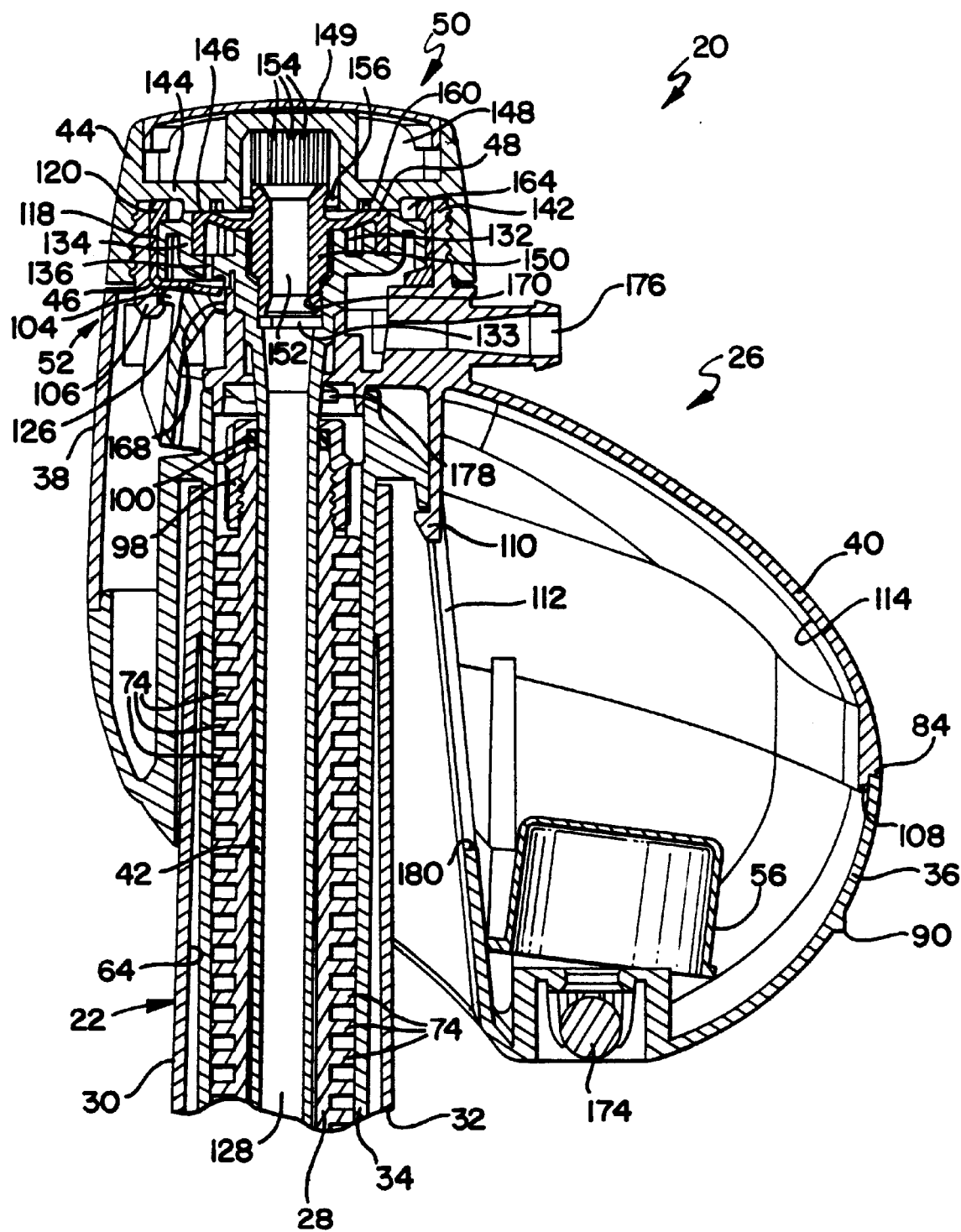
FIG. 4 is a fragmentary enlarged sectional view similar to the upper portion of FIG. 3 showing the fill valve in the open condition.

When the tube portion 34 of the lower body 36 has been inserted into the cavity 64 of the riser base 32, a seal nut 98 is threaded onto the top of the shank 28 (FIG. 4). An O ring seal 100 is captured under the nut 98. The nut captures the tube portion 34 in the riser base 32 because the lugs 80 cannot fit over the nut 98. The nut and seal do not restrict axial sliding motion or rotational locking motion of the tube portion 34 during height adjustment.

Figure 11:
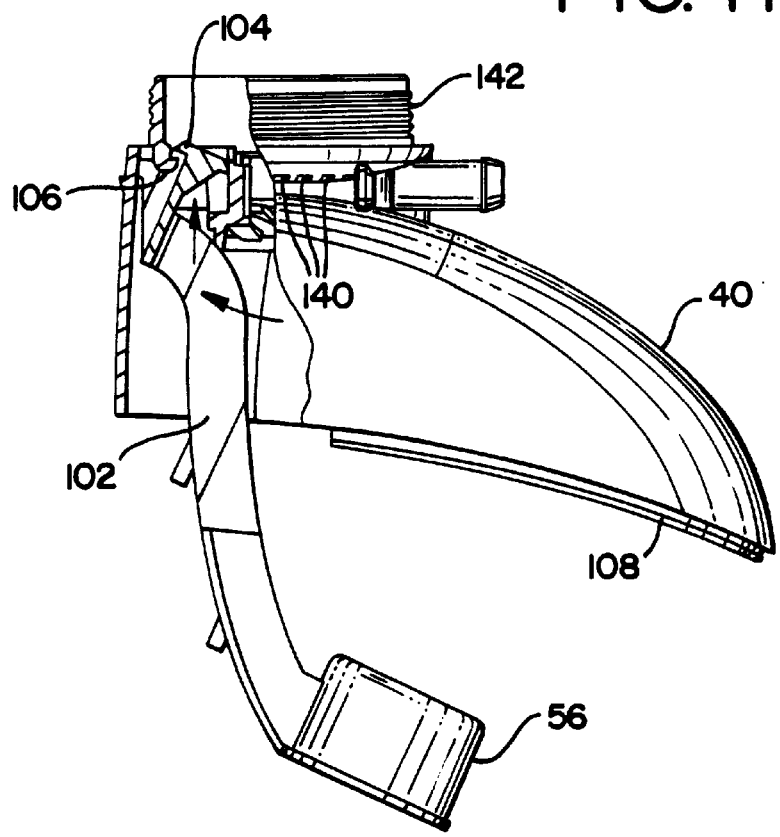
FIG. 11 is a side view, partly in cross section, of the float and cover of the fill valve, illustrating assembly of the float in the cover.
Figure 12:
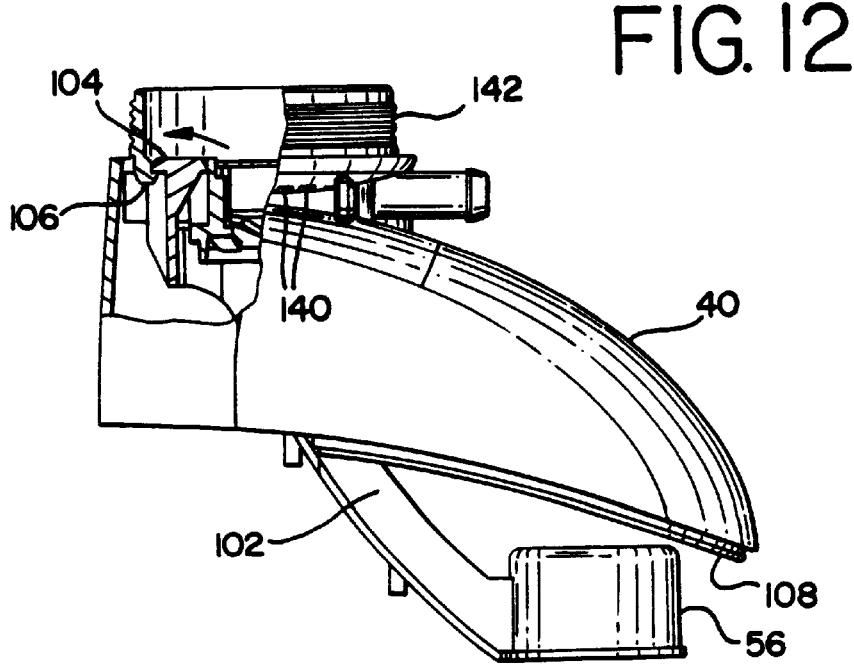
FIG. 12 is a view like FIG. 11 illustrating a subsequent step in assembly of the float in the cover.

Float 56 includes a laterally extending support lever 102 terminating in a single small projecting tip 104. As seen in FIGS. 11 and 12, the upper body member or cover 40 has an integrally formed internal hook 106. To mount the float 56 in the cover 40, the float 56 is angled down relative to the cover 40 as seen in FIG. 11 and the tip 104 is inserted upwardly into the cover. Then as seen in FIG. 12, the float 56 is rotated upward relative to the cover 40 to engage the tip 104 with the hook.

With the float 56 in place, the upper body or cover 40 is attached to the lower body 36. A guide lip 108 on the cover 40 fits into the lower body 36 along the seam 84. The cover 40 is moved downward to a full seated position where a snap arm 110 (FIGS. 3 and 4) engages the top of a body window 112 to hold the parts in assembly without separate fasteners or the like. The assembled body portions 36 and 40 define a float chamber 114 in which the float 56 is contained.

A single point pivot support is formed by the tip 104 and hook 106 permitting the float 56 to pivot between upper (FIGS. 3 and 5) and lower (FIGS. 4 and 6) positions within chamber 114. No fasteners or other parts are needed to pivotally support the float 56. When the body portions 36 and 40 are assembled, as can be seen in FIG. 4, the float 56 is captured. Even in the illustrated lowermost position, the tip 104 is retained in the hook 106 because the lower body portion 36 limits float movement.

Figure 13:
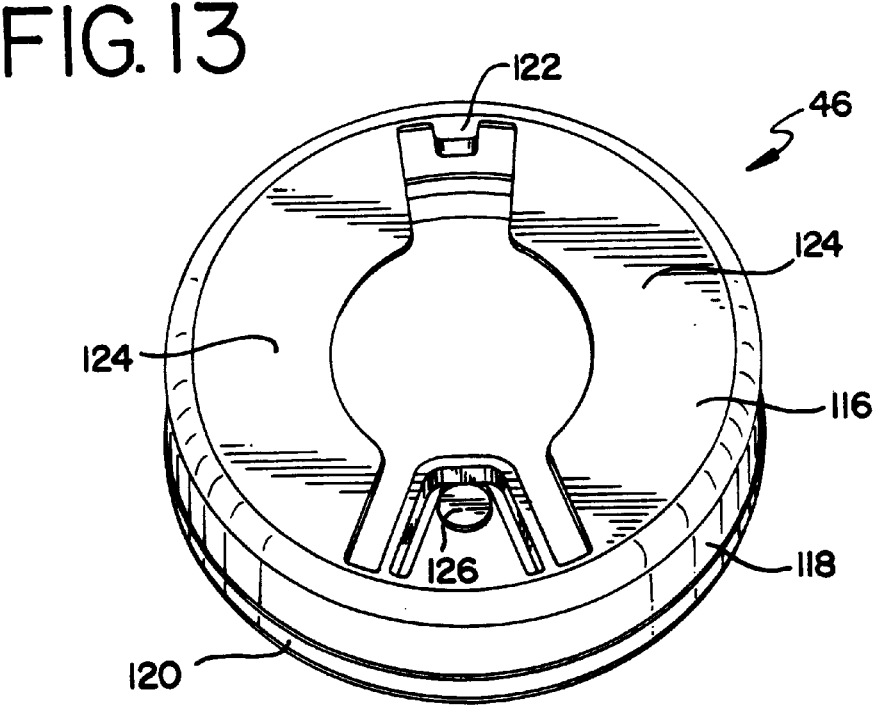
FIG. 13 is an enlarged top isometric view of the flexible cup of the fill valve.

Flexible cup 46 (FIG. 13) includes a generally circular base 116 and a continuous side wall flange 118 terminating in an enlarged bead 120. The base 116 is apertured to define a positioning tab 122, a pair of vacuum breaker panels 124 and a pilot valve member portion 126.

Inlet tube member 42 includes an elongated tube portion 128 and an enlarged head 130. An annular valve control chamber 132 is defined in the top of the head 130 within a circular outer wall 134 and surrounding a central inlet flow passage 133. A pilot valve orifice 136 extends downwardly through the head 130 from the control chamber 132. A plurality of outlet flow ports 138 extend axially through the head 130 and are located between the wall 134 and the outer edge of the head 130.

The flexible cup 46 is installed over the bottom of the enlarged head 130 with the tube portion 128 extending downward through the base 116 of the cup 46. The flange 118 encircles the head 130. The pilot valve portion 126 overlies the pilot valve orifice 136 and cooperates to form the pilot valve 52. The vacuum breaker panels 124 overlie the lower ends of the outlet flow ports 138 and cooperate to form the vacuum breaker valve 54.

The inlet tube member 42 with the flexible cup 46 in place is assembled in the body 38. The tube portion 128 is inserted through the seal nut 98 and O ring 100 and into the interior of the shank 28. Inlet flow from the inlet port 68 in the shank 28 flows up through the tube 128 and inlet flow passage 133 to the main valve 50. Vacuum breaker ports 140 in the cover 40 (FIGS. 1, 5 and 6) lead from the region of the vacuum breaker panels 124 to the exterior of the housing 22.

The valve disk 48 is placed on the top of the inlet tube head 130, and the cap 44 (FIG. 14) is threaded onto a threaded wall 142 of the cover 40. The cap 44 includes a wall 144 that engages the enlarged bead 120 to provide a seal between the cap and the body 38. Wall 144 includes a valving surface 146 that cooperates with the valve disk 48 to provide the main valve 50. A sound deadening empty chamber 148 above the wall 144 and below a cap top wall 149 attenuates valve noise caused by liquid flow through the valve.

Valve disk 48 includes a peripheral flange that is captured in a mating groove in the head 130. The central portion of the disk 48 includes an axially movable hub 150 surrounding an inlet flow path 152. The bottom of the hub 150 slides in the passage 133 while the top of the hub 150 slides in an array of strainer ribs 154 in the cap 44. The lower ends of the passages between the strainer ribs 154 serve as a central inlet 156 to the main valve 50.

Figure 5:
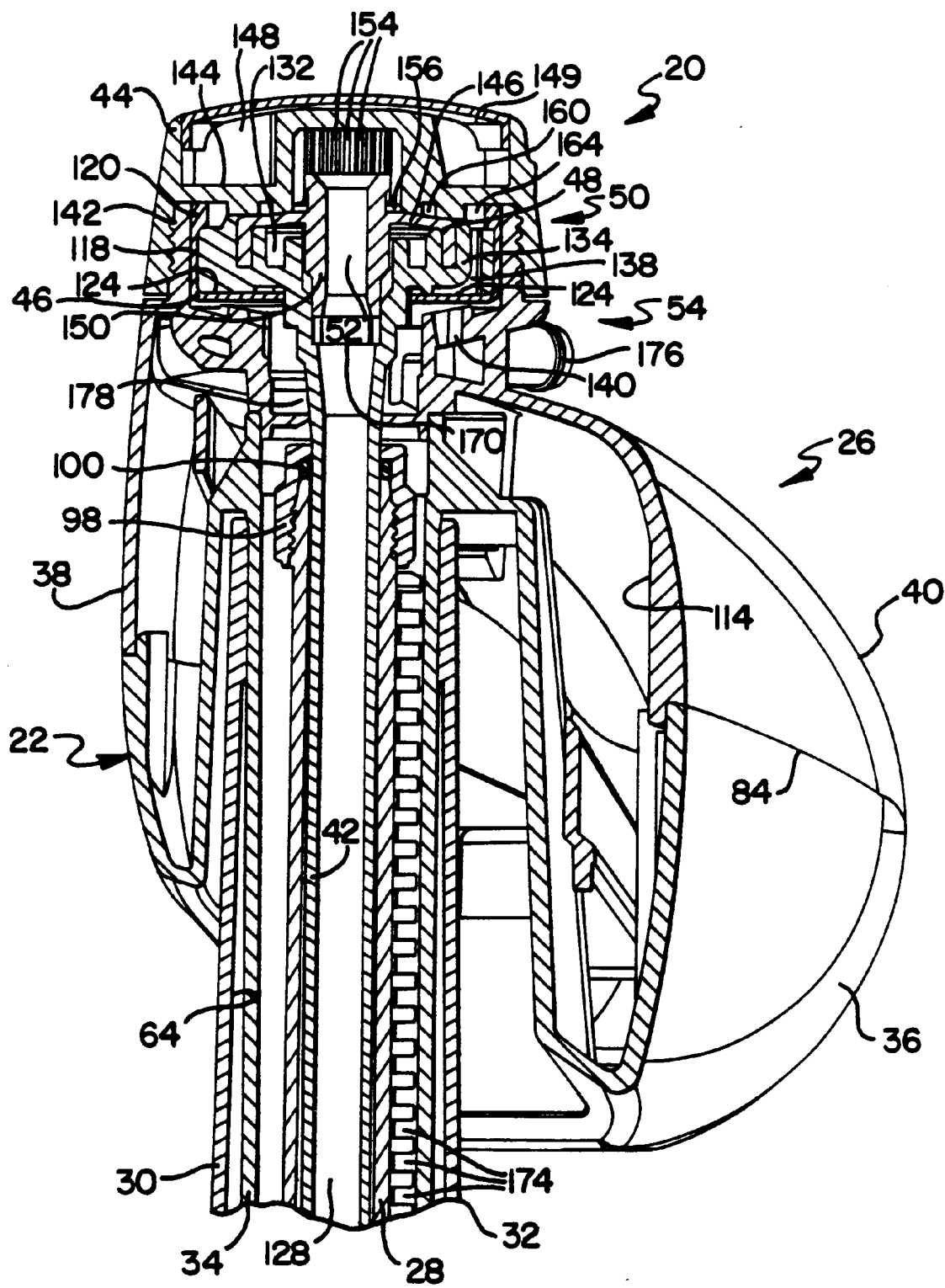
FIG. 5 is a fragmentary enlarged sectional view taken along the line 5—5 of FIG. 2 and showing the fill valve in the closed condition.
Figure 14:
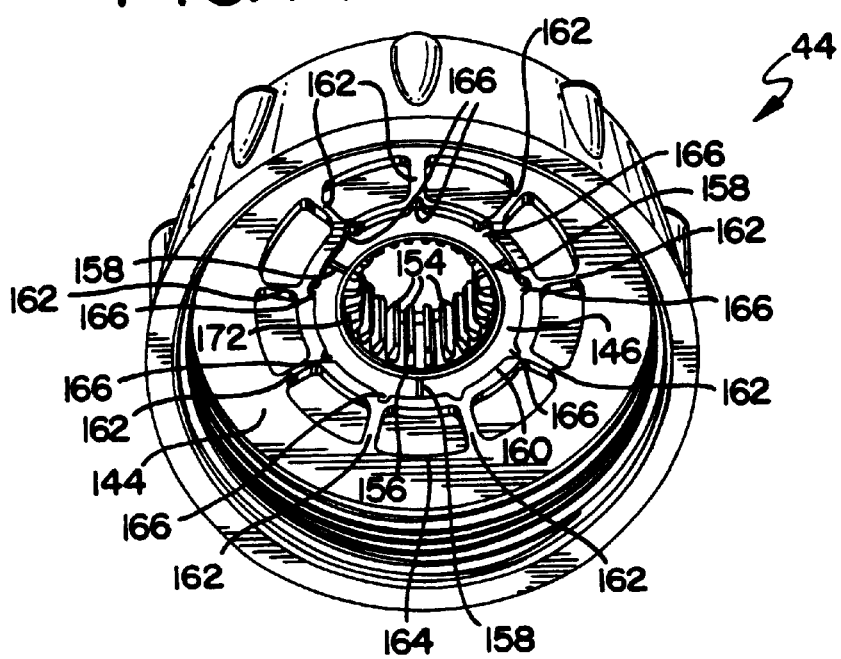
FIG. 14 is an enlarged bottom isometric view of the cap of the fill valve.

The valving surface 146 as seen in FIG. 14 is a raised surface area projecting below the wall 144. As seen in FIG. 5, the valving surface 146 is somewhat concave. Flow paths 158, 160 and 162 are formed in the valving surface 146. Three equidistantly spaced, radially extending, small flow paths 158 extend in surface 146 outwardly from the central inlet 156. The paths 158 terminate in a continuous, circular, peripherally extending, relatively large flow path 160. Nine relatively large flow paths 162 extend radially outward from the circular path 160 to a continuous circular outlet flow region 164 encircled by the bead 120. Projections 166 extend radially outward from the inner wall of the circular passage 160 toward each of the passages 162. The paths 158 are offset from the paths 162 and none are directly aligned. The small paths 158 offer substantially more restriction to flow than the paths 160 and 162 which have larger cross sectional areas.

The operation of the fill valve 20 is now described. The fill valve 20 is shown in its closed condition in FIGS. 3 and 5. The float 56 is pivoted to its uppermost position by water entering the float chamber 114 through the window 112. A pad 168 on the float support lever near the tip 104 holds the pilot valve member portion 126 of the flexible cup 46 in sealing relation against the pilot valve orifice 136 and the pilot valve 52 is closed.

Grooves 170 formed in the central passage 133 through the head 130 of the tube member 42 permit restricted flow of pressurized liquid from the inlet port 68 to the control chamber 132. Pressure trapped within the control chamber 132 by the closed pilot valve 52 forces the valve disk 48 up into sealing relationship against the valving surface. A raised circular rib 172 surrounding the central inlet 156 assures positive shut off of the main valve 50. A buoyant ball check 174 in the bottom of the float chamber 114 is in its closed position. As seen in FIG. 5, the vacuum breaker panels 124 are in their upper position venting the region below the flexible cup 46 to atmosphere through the vacuum breaker ports 140.

Figure 6:
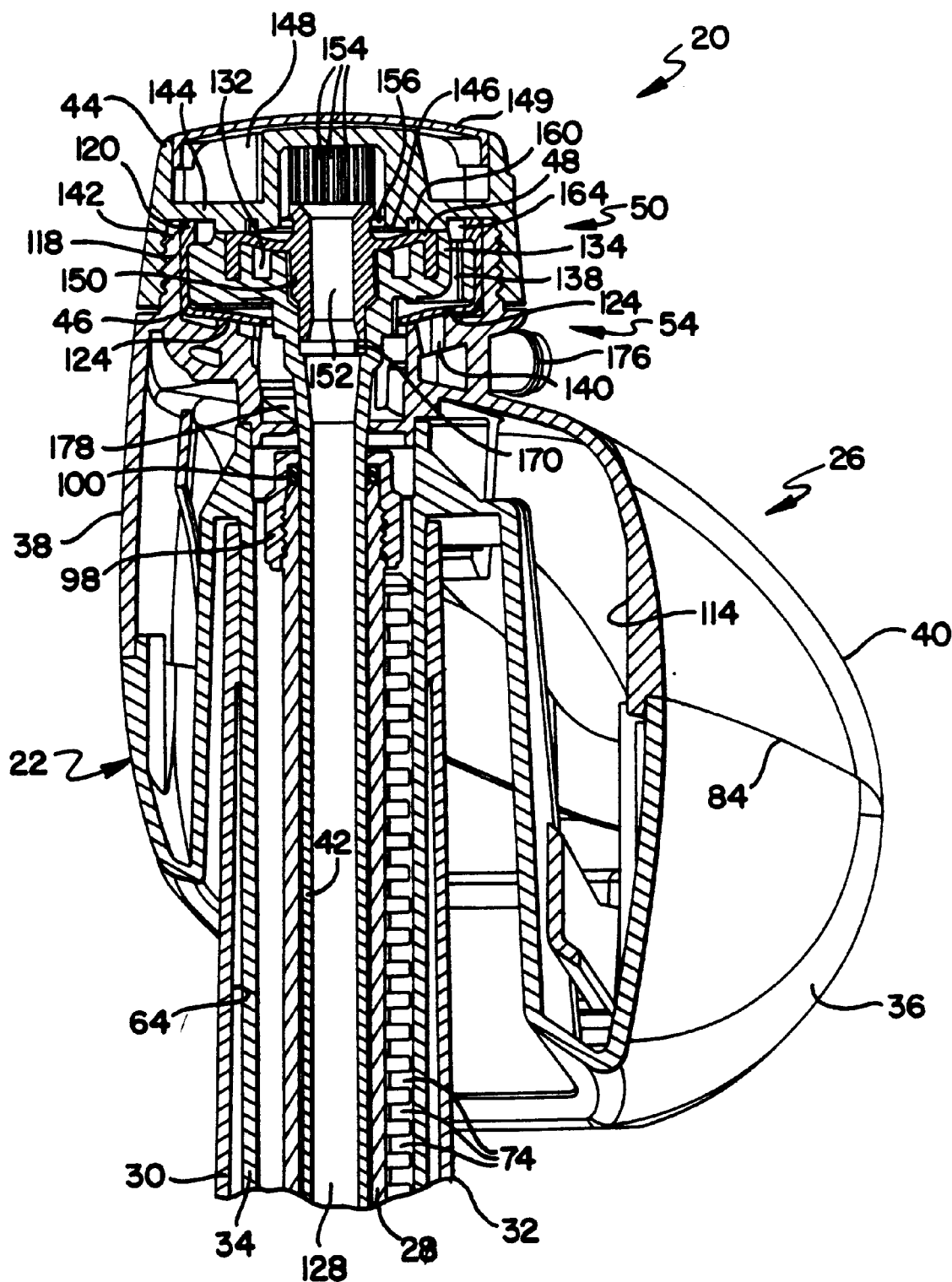
FIG. 6 is a fragmentary enlarged sectional view similar to FIG. 5 showing the fill valve in the open condition.

When the water level falls in the tank in which the fill valve 20 is mounted, the fill valve assumes the open condition illustrated in FIGS. 4 and 6. As the level descends, the ball check drops, draining water from the float chamber 114. The float 56 pivots down and the pad 168 permits the pilot valve member 126 to move downward (FIG. 4) and release pressure from the control chamber 132 in a flow greater than permitted by the restricted grooves 170. Pressure drops in the control chamber 132 and the valve disk 48 moves downward to its open position due to inlet pressure acting on its upper surface. Liquid flows across the valving surface 146 and through the paths 162 to the circular outlet region 164 and down through the outlet flow ports 138 in the head portion 130 of the inlet tube member 42. Flow drives the panels 124 down against the vacuum breaker ports 140 to isolate the outlet flow from the exterior of the housing 22.

A portion of the outlet flow is diverted to a trap reseal outlet 176. Conventionally about twenty percent of the flow is directed through the tank overflow tube to reseal the siphon trap of the associated fixture. Ribs 178 in the lower portion of the upper body 36 impart a swirling action to the remaining flow as it moves downward through the tube portion 34 toward the outlet ports 60. The swirling action entrains and purges trapped air in the discharge path.

As the water level rises, the ball 174 seats and the water level reaches a height sufficient to flow over a weir wall 180 at the bottom of the body window 112. The float chamber 114 fills, raising the float 56 and closing the pilot valve 52. Increasing pressure in the control chamber resulting from restricted flow through grooves 170 closes the main valve 50. The valve disk 48 closes gradually with a rolling type action from the full open position (FIGS. 4 and 6) to the closed position (FIGS. 3 and 5).

In the full open position, liquid flows relatively freely across the valving surface 146 from the circular inlet region 156 over the raised rib 172 and through the outer parts of the large flow paths 162 to the circular outlet region 164. The valve disk is spaced above the restricted paths 158 and the circular path 160, and the flow is substantially all in a radial direction.

As the valve disk 48 begins to close against the valving surface 146, its outer portion initially moves against the projections 166. As the closing disk 48 throttles water flow into the segmented circular path 160, the free radial flow of liquid into the radial paths 162 is interrupted. The liquid is forced to follow a toroidal path through the circular path 160 to reach the paths 162. As the disk 48 closes further, it closes over the restricted paths 158, further limiting flow. Finally the disk closes onto the circular rib 172 positively blocking all flow. The projections 166 also support the valve disk 48 in the closed position.

The fill valve 20 achieves the contradictory goals of free flow at full open and quiet flow when closing. During the transition when the valve is partly open, liquid must follow a tortuous path including offset radial segments in the paths 158 and 162 and a toroidal segment in the circular path 160. This provides a flow impedance that dissipates energy and achieves quiet operation. During full flow operation the flow impedance is removed from the flow path because the valve disk 48 separates from the valving surface 146 permitting direct radial flow rather than impeded tortuous flow.

Another advantage of the fill valve 20 is that it is easy to clean the main valve area in the event that it becomes clogged or fouled with dirt or debris in the water supply. When the cap is removed, there is free access with no further disassembly to the main valving region including the top of the valve disk 48 and the valving surface 146.

While the present invention has been described with reference to the details of the embodiment of the invention shown in the drawing, these details are not intended to limit the scope of the invention as claimed in the appended claims.

What is claimed is:

1. A height adjustable fill valve for a toilet tank comprising:
   a valve head portion including valve means for selectively admitting water to the tank;
   a riser assembly adapted to be mounted to an inlet port in the tank wall and to support said valve head portion at a location space above the inlet port;
   said riser assembly including a central shank surrounded by an outer sleeve, said shank and sleeve defining therebetween an elongated, cylindrical cavity having an annular cross section;
   said head portion including a downwardly extending tubular portion telescopingly and slideably received within said cylindrical cavity, said sleeve at least partially surrounding said tubular portion;
   and mating locking structures concealed within said cavity and formed on said tubular portion and said riser assembly for securing said head assembly at a selected height in the tank.

2. The height adjustable fill valve of claim 1, said locking structures including a plurality of teeth on one of said tubular portion and riser assembly and a mating lug on the other of said tubular portion and riser assembly.

3. The height adjustable fill valve of claim 2 wherein said teeth are defined on said shank and said lug is defined on said tubular portion.

4. The height adjustable fill valve of claim 1 wherein said shank defines an inlet flow path from said inlet port to said valve means and the region surrounding said shank defines an outlet flow path from said valve means.

5. The height adjustable fill valve of claim 1 wherein said shank and said sleeve are separate members assembled together by mating lock means located at the lower end of said riser.

6. A height adjustable fill valve for a toilet tank comprising:
   a head portion including a body and valve means for selectively admitting water to the tank;
   a level responsive member for closing said valve means when the tank water level reaches a predetermined elevation, said body having a reference point fixed in relation to the predetermined elevation after said fill valve is installed in said toilet tank;
   a riser assembly adapted to be mounted to an inlet port in the tank wall and to support said valve head portion at a location spaced above the inlet port;
   said riser assembly including slidable telescoping portion for varying the length of the riser assembly and the height of said head portion in the tank;
   a flange at the bottom of said riser portion having a lower surface adapted to engage the tank wall and a mounting extension protruding from the lower surface of said flange and adapted to extend through the tank wall for attaching the riser assembly to the tank wall, said mounting extension having a predetermined axial length from its distal end to the lower surface of said flange;

the fill valve being characterized by:
- a visual indicator disposed on the outer surface of said body and spaced below the reference point on said body a distance equal to said predetermined axial length;
- whereby the desired height of said head portion in the tank can be selected by placing the distal end of said mounting extension against the bottom surface of the toilet tank and adjusting the length of the riser assembly so that the elevation of said visual indicator matches a pre-selected height in said toilet tank.

7. The height adjustable fill valve of claim 6 wherein said visual indicator is a lug molded on said body.

8. The height adjustable fill valve of claim 6 further comprising additional indicia on said body including a first visual indication of water level maintained by the fill valve.

9. The height adjustable fill valve of claim 8, said additional indicia further including a visual indication of the upper end of a tank standpipe above said visual indication of said predetermined elevation.

10. the height adjustable fill valve of claim 8, said body having body portions and said additional indicia being a seam of said body portions.

* * * * *